Jan. 28, 1936.  E. BURNS ET AL  2,028,966
RELEASING OVERSHOT
Filed May 7, 1934  2 Sheets-Sheet 1
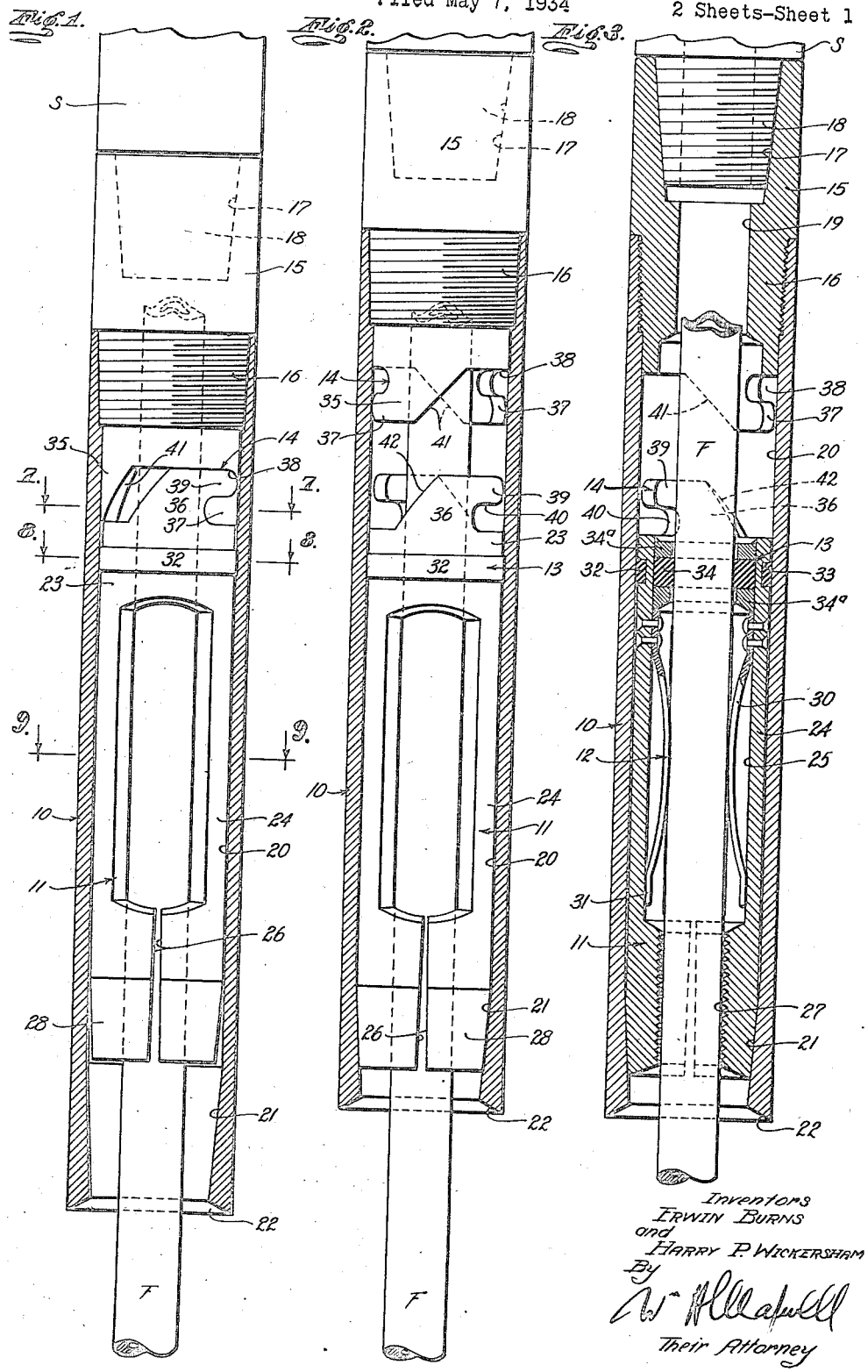
Inventors
Erwin Burns
and
Harry P. Wickersham
By
Their Attorney

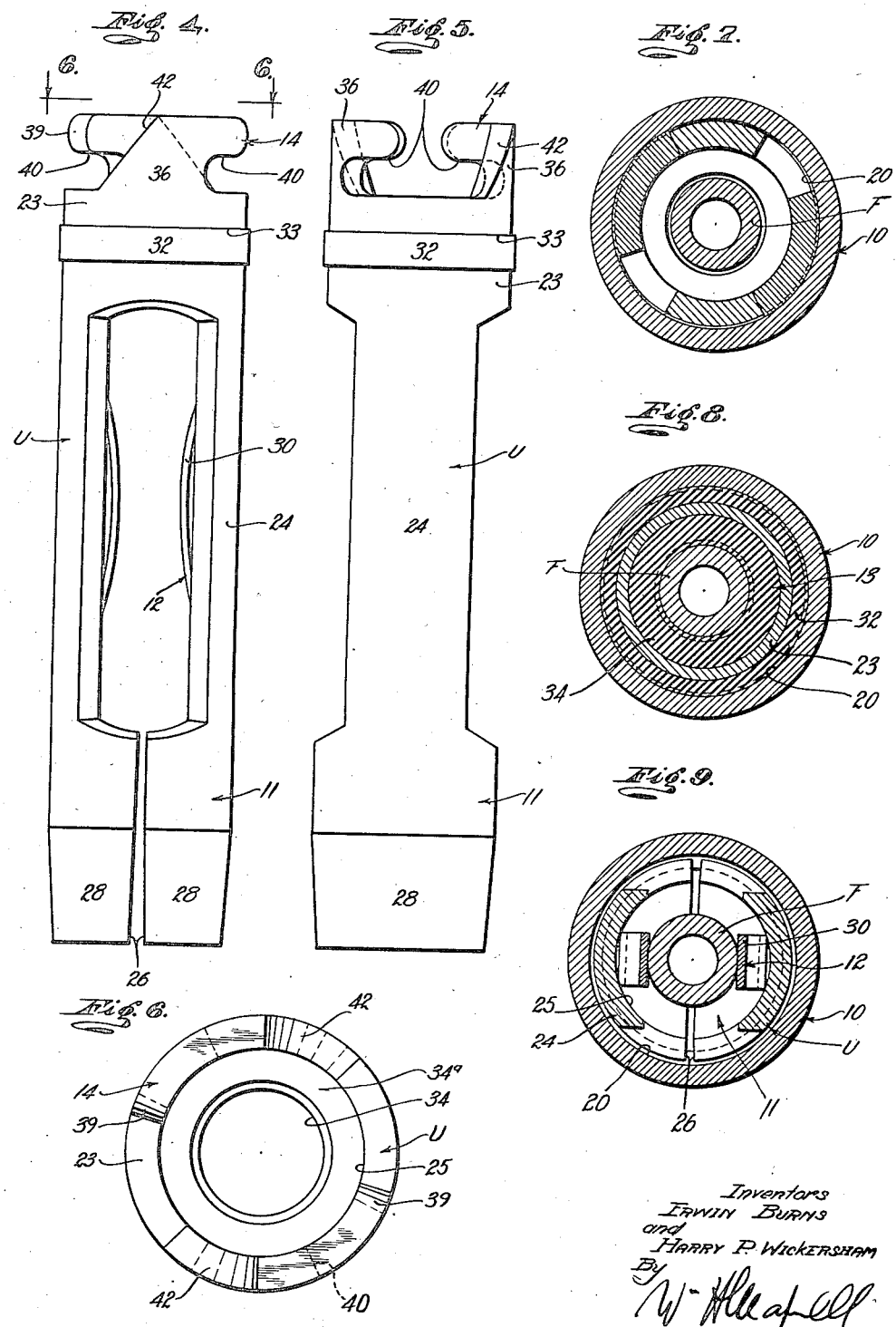

Patented Jan. 28, 1936

2,028,966

UNITED STATES PATENT OFFICE 2,028,966

RELEASING OVERSHOT

Erwin Burns, Los Angeles, and Harry P. Wickersham, Huntington Park, Calif.

Application May 7, 1934, Serial No. 724,294

1 Claim. (Cl. 294—102)

This invention relates to a fishing tool for removing or recovering lost objects from a well and relates more particularly to a releasing overshot. A general object of this invention is to provide a simple, practical and improved overshot for recovering lost pipe, tubing, etc. from a well.

Another object of the invention is to provide an overshot that is readily detachable or releasable from the fish in the event that the fish is caught fast and cannot be withdrawn from the well.

Another object of the invention is to provide a releasing overshot that embodies novel and effective packing means for sealing with the overshot body and for sealing with the fish whereby fluid may be pumped downwardly through the fish to aid in freeing or dislodging it from the well.

Another object of the invention is to provide a releasing and packing overshot of the character mentioned that may be passed downwardly any desired distance over the fish, thereby assuring a firm effective gripping engagement of its jaws with the fish.

Another object of the invention is to provide an overshot embodying gripping jaws and springs associated with the jaws for frictionally engaging the fish to resist longitudinal movement of the jaws with respect to the fish, whereby the body of the overshot may be moved longitudinally relative to the jaws to fully and positively actuate them into gripping engagement with the fish.

A further object of the invention is to provide a releasing overshot of the character mentioned that is easy to control and operate and that is simple and inexpensive of manufacture.

Other objects and features of our invention will be better and more fully understood from the following detailed description of a typical preferred form of the invention, throughout which description reference may be had to the accompanying drawings, in which:

Fig. 1 is a longitudinal detailed sectional view of the overshot showing the jaws in elevation and releasably held in the unactuated position. Fig. 2 is a view similar to Fig. 1 showing the jaws actuated or ready for actuation. Fig. 3 is a view similar to Fig. 2 illustrating the jaws and the associated parts in longitudinal cross section. Fig. 4 is an enlarged side elevation of the open or split side of the internal unit of the overshot. Fig. 5 is an enlarged side elevation of the closed side of the unit. Fig. 6 is a top or plan view of the unit being a view taken as indicated by line 6—6 on Fig. 4 and Figs. 7, 8 and 9 are enlarged transverse detailed sectional views taken as indicated by lines 7—7, 8—8 and 9—9, respectively, on Fig. 1.

The overshot of our invention includes, generally, a tubular body 10 adapted to be passed downwardly over a fish F, fish gripping jaws 11 actuated by movement of the body 10, means 12 for resisting movement of the jaws 11 with respect to the fish F, means 13 for packing or sealing about the fish F, and means 14 for connecting the jaws 11 with the body 10 to prevent relative movement between the body and jaws to hold the jaws released from the fish in the event that the fish cannot be withdrawn from the well.

The body 10 is adapted to be attached to the lower end of a fishing string S of drill pipe, or the like. The body 10 of the overshot is an elongate tubular member housing for carrying the gripping jaws 11 and having an open lower end for passing downwardly over the fish F. A member 15 is provided on the upper end of the body 10 to facilitate the connection of the body with the fishing string S. The member 15 has a pin 16 threaded into the upper end of the body. A socket 17 is provided in the upper end of the connecting member 15 for receiving the tapered screw-threaded pin 18 of a tool joint section of the fishing string. A central longitudinal opening 19 is provided in the connecting member 15 to pass fluid and to receive the fish F. The opening 20 of the body 10 has a downwardly and inwardly tapered wall portion or surface 21 at its lower end. The lower end 22 of the body 10 may be tapered or bevelled upwardly and inwardly to guide the body on the fish F.

The gripping jaws 11 are arranged in the body 10 to be actuated through cooperation with the surface 21 when the body is moved upwardly with respect to them. The gripping jaws 11 are embodied in or form parts of the novel and simplified internal unit U illustrated in detail in Figs. 3 to 6, inclusive, of the drawings. This internal unit U of the tool comprises what may be termed a sleeve or ring 23, two spaced arms 24 extending downwardly from the ring 23 and the gripping jaws 11 on the lower ends of the arms. The unit U may be an integral tubular member whose central longitudinal opening 25 is considerably larger in diameter than the fish F for which the tool is designed. The unit U is freely shiftable or slidable longitudinally in the body opening 20. The arms 24 are diametrically opposite and are of substantial length.

The gripping jaws 11 are integrally joined with the lower ends of the arms 24 and are preferably of greater width than the arms. In practice the opposing longitudinal edges 26 of the jaws 11 may be downwardly divergent to permit the required inward movement or contraction of the jaws. The inner sides of the jaws 11 are provided with longitudinal grooves having teeth 27 for gripping the fish F. Downwardly and inwardly inclined peripheral surfaces 28 are provided on the jaws 11 to cooperate with the body surface 21. The cooperation of the surfaces 28 with the surface 21 upon upward movement of the body relative to the jaws 11 causes inward actuation of the jaws. The arms 24 are flexible to permit the inward actuation of the jaws 11 and are resilient to automatically return the jaws to their original unactuated positions upon disengagement of the surfaces 28 and 21.

The means 12 for resisting movement of the jaws 11 with respect to the fish F is an important feature of the invention as it assures the dependable actuation of the jaws 11 when the body is moved upwardly from the position illustrated in Fig. 1 of the drawings. The means 12 is in the nature of a spring means connected or associated with the internal unit U described above. In the preferred form of the invention illustrated in the drawings the means 12 includes two or more springs 30 extending longitudinally at the inner sides of the arms 24. The upper ends of the springs 30 are attached to the inner sides of the arms 24 by suitable rivets or the like. The fish engaging springs 30 are bowed inwardly to frictionally contact the fish. The lower end portions 31 of the springs 30 may slidably bear against the inner sides of the arms 24. When the tool has been lowered into the well so that the fish F is received in the lower end of the body 10 and passes through the unit U the springs 30 frictionally engage the fish. This engagement of the springs 30 with the fish resists movement of the unit U whereby the body 10 may be moved with respect to the unit to actuate the jaws 11 and to effect their gripping contact with the fish.

The packing means 13 is provided to seal or pack off between the interior of the body 10 and the fish F whereby fluid pumped downwardly through the fishing string S is made to pass downwardly through the tubular fish F to discharge from its lower end and aid in freeing or loosening the fish. The packing means 13 includes a ring 32 of packing arranged in an annular groove 33 in the periphery of the ring 23. The packing 32 slidably engages and seals with the wall of the opening 20 and offers but little resistance to longitudinal movement between the body 10 and unit U. The packing means 13 also includes an annular body 34 of packing arranged in the opening 25 of the ring 23. The packing 34 is provided to seal with the fish F and is retained between two rings 34ª. The rings 34ª may be welded or otherwise secured to the interior of the unit ring 23. When the tool has been moved to a position where the fish F projects upwardly through the unit U the packing 34 effectively seals about the fish and the packing 32 seals with the interior of the body 10 so that fluid pumped downwardly through the string S is passed through the fish to discharge from its lower end. This discharging fluid may free or aid in freeing the lower end of the fish.

The means 14 for connecting the gripping jaws 11 with the body 10 to effect the release of the jaws from the fish F permits the tool to be easily released from the fish if the fish cannot be loosened or pulled from the well. The means 14 consists of parts on the lower end of the pin 16 and parts on the upper end of the ring 23 adapted to mesh or interengage. Two diametrically opposite parts 35 project downwardly from the lower end of the pin 16 and two similar parts 36 project upwardly from the upper end of the ring 23. Lugs 37 project horizontally or circumferentially from the lower ends of the parts 35 leaving notches 38 in the forward sides of each part. Lugs 39 project horizontally from the rear sides of the parts 36 and leave notches 40 in the rear sides or edges of the parts 36. The rear edges or sides 41 of the parts 35 and the forward sides 42 of the parts 36 are inclined or spiralled to cooperate to assist the engaging or meshing of the lugs 37 and 39. With the jaws 11 in gripping engagement with the fish F the body 10 may be moved downwardly to disengage the surface 21 from the jaws so that the arms 24 spring or tend to spring the jaws to their normal positions. The downward movement of the body brings the parts 35 in cooperation with the parts 36. The fishing string S may be turned slightly in a right hand direction to cause the lugs 37 to enter the notches 40 and cause the lugs 39 to enter the notches 38. The cooperating lugs and notches connect the unit U with the body 11 to be moved longitudinally with the body so that the jaws 11 are fully disengaged from the fish upon the body being moved upwardly.

It is believed that the operation of the releasing overshot provided by our invention will be readily apparent from the foregoing detailed description. The tool may be lowered into the well on the fishing string S with its parts in the position illustrated in Fig. 1. In practice the internal unit U may be free in the body 10 when the tool is lowered into the well. When the body 10 is passed downwardly over the fish F the fish is received in the unit U and may project upwardly through the opening 19 into the string S. In this manner the overshot may be passed downwardly any desired or required distance over the fish. To actuate the overshot to grip the fish F the string may be turned slightly in a left-hand direction to insure the disconnecting of the means 14 whereupon the string S is moved upwardly. Upward movement of the body 10 with the string S brings the face 21 in wedging or active cooperation with the surfaces 28 and causes the gripping jaws 11 to be actuated inwardly. The teeth 27 of the jaws firmly grip the fish upon this actuation of the jaws. During the upward movement of the body 10 to effect the actuation of the jaws 11 the springs 30 which are in frictional engagement with the fish F resist movement of the unit U with respect to the fish. This movement resisting engagement of the springs 30 with the fish holds or tends to hold the jaws 11 against movement so that the surface 21 is moved upwardly against the surface 28 of the jaws to bring about the full effective actuation of the jaws. As described above the packing 32 seals with the interior of the body 10 and the packing 34 seals with the fish F so that fluid may be pumped downwardly through the string S to aid in loosening or freeing the fish. The string S may be moved upwardly or may be put under a tensile strain to dislodge the fish F. The fish, if freed, may be removed from the well on the lower end of the string S, the gripping jaws 11 retaining their gripping and supporting engagement with the fish during its removal. In the event that the fish F cannot be freed or withdrawn from the well the overshot 11 may be released from the fish by moving the body downwardly to free the surface 21 from the jaw surfaces 28, the arms 24 are then free to spring the jaws away from the fish. The above described downward movement of the body 10 brings the parts 35 into engagement with the parts 36. The string S may be given a slight turn in the right-hand direction to engage the lugs 37 and 38 and thus connect the unit U with the body 10 for upward movement with the body. The string S is then raised to fully free the tool from the fish F.

Having described only a typical form and application of our invention, we do not wish to be limited or restricted to the specific form and application herein set forth, but wish to reserve to ourselves any modifications or variations that may appear to those skilled in the art or fall within the scope of the following claim.

Having described our invention, we claim:

A well tool including a tubular body adapted to be passed over a fish, a depending lug in the upper end of the body, a gripping unit shiftable in the body comprising a ring, arms depending from the ring, and gripping jaws on the arms actuated against the fish through cooperation with the body, a lug on the unit adapted to be engaged with the first mentioned lug to hold the unit in a released position, and inclined faces on the lugs adapted to cooperate to assist in effecting the engagement of the lugs.

ERWIN BURNS.
HARRY P. WICKERSHAM.